United States Patent [19]

Appel et al.

[11] 4,356,865

[45] Nov. 2, 1982

[54] PUMP PLUG FOR USE IN WELL OPERATIONS

[75] Inventors: Cornelis Appel; Bartel Kuilman, both of Amsterdam, Netherlands

[73] Assignee: Shell Oil Company, Houston, Tex.

[21] Appl. No.: 300,407

[22] Filed: Sep. 8, 1981

[30] Foreign Application Priority Data

Sep. 25, 1980 [GB] United Kingdom ................ 8030936

[51] Int. Cl.³ ............................................. E21B 23/08
[52] U.S. Cl. .................................... 166/153; 166/192
[58] Field of Search .............................. 166/153–156, 166/173, 177, 192, 291, 202; 15/104.06 R

[56] References Cited

U.S. PATENT DOCUMENTS

| 2,205,739 | 6/1940 | Wilson | 166/173 |
|---|---|---|---|
| 2,332,984 | 10/1943 | Brackeen | 15/104.06 R |
| 2,427,632 | 9/1947 | Stephens | 166/153 |
| 3,104,714 | 9/1963 | Terrel et al. | 166/153 |
| 3,251,416 | 5/1966 | Kiel | 166/177 |
| 3,434,539 | 3/1969 | Merritt | 166/153 |
| 3,437,137 | 4/1969 | Scott | 166/153 |

FOREIGN PATENT DOCUMENTS 1423132  1/1976  United Kingdom ......... 15/104.06 R

*Primary Examiner*—Stephen J. Novosad
*Assistant Examiner*—Joseph Falk

[57] ABSTRACT

A pump plug for use in through-the-flowline well operations, including a sleeve provided with annular sealing fins, which fins are flexible in both directions of the central axis of the sleeve. Support means are mounted on the sleeve for supporting the sealing fins in each of the flexed positions thereof.

5 Claims, 10 Drawing Figures

PUMP PLUG FOR USE IN WELL OPERATIONS

BACKGROUND OF THE INVENTION

The invention relates to a pump plug for use in well operations such as for displacing well tools via a flowline into a well, or for well swabbing purposes, examples of which are shown in U.S. Pat. Nos. 3,031,241 and 3,352,212, and German Pat. No. 1,811,038. The first type of operations is also referred to as through-the-flowline operations (which operations are indicated hereinafter by the expression "TFL-operations").

In TFL-operations, tools are transported from a site on land or a location on an offshore production platform via a flowline extending along the sea bottom or ocean floor to a submarine well. The flowline communicates with the production string in the well in a manner such that the tools can be transported via the flowline into the production string and subsequently be displaced downwards through the string to a level in the well at which a predetermined action is to be carried out by the tools. The displacement of the tools is obtained by connecting the tools to a pump plug, and creating a fluid pressure difference over the pump plug.

In general, a pump plug for use in this type of operations includes a cylindrical sleeve with a central axis, and an integral body of resilient material mounted on the sleeve, the body comprising a cylindrical part carrying a plurality of annular resilient sealing fins. The outer diameter of the sealing fins is selected such that when the plug is placed in a fluid conductor with circular cross-section, at least the rim portion of each fin seals against the inner wall of the fluid conductor. It will be appreciated that by closing off the flow passage through the sleeve and supplying fluid under pressure to one end of the pump plug for creating a pressure difference over the pump plug, the plug will be displaced through the conductor in a direction away from the supply of pressure fluid. A moderate pressure difference is already sufficient for displacing the pump plug. At such a pressure difference the outer rims of the resilient sealing fins stay in contact with the wall of the conductor thereby preventing the pressure fluid from by-passing the plug. The sealing fins, of at least the rim portions thereof are sufficiently flexible to follow variations in diameter of the flow conductor, such as are present at locations where sections of the flow conductor are coupled to each other, as well as in bends or curved portions of the conductor. Since the sealing fins will wear off when the plug is propelled through the conductor, the size of the sealing fins should be chosen such that a certain amount of wear is allowed before by-passing of the pressure or displacement fluid along the pump plug will occur.

When the pressure difference over the plug exceeds a predetermined value, the fins will loose their sealing position and the pressure fluid will by-pass the plug. By-passing of the pressure fluid may be necessary for a number of different purposes such as for propelling a plurality of pump plugs attached to each other, and for avoiding complete obstruction of flow conductors by pump plugs.

Apart from using the pump plug in TFL-operations, the plug may also be used in swabbing operations. In these latter operations a cable is connected to one end of the sleeve (that has the flow passage therethrough closed off against fluid flow), and the plug is (after weightening) lowered in the production tubing of a well. By pulling the cable upwards, the well pressure is lowered and the well will start to flow. This is a known technique which does not require any further detailed description thereof.

The known pump plugs designed for use in the above-mentioned operations are provided with sealing fins of cup-shaped configuration. In TFL-operations, two plugs are interconnected such that the cups are positioned in opposite directions. Hereby, the plugs will seal off against the inner surface of the flow conductor in opposite directions of plug motion. Unfortunately, it has been found in field operations, that the cups when positioned with the open ends thereof in the direction of travel, will easily be damaged when passing through portions of the flow conductor that have a reduced diameter. In passing through portions of the flow conductor where an abrupt decrease in diameter of the flow passage therethrough takes place, the damage of the cups may reveal itself in the form of cracks at the locations where the cups are connected to the cylindrical part of the integral body of resilient material. In extreme cases, the cups will even be torn from the integral body.

It will be appreciated that such damage will render the pump plug useless in TFL-operations since, once the plug has been pumped down to the bottom of a well, it cannot be returned to the surface by reversing the flow direction of the displacement fluid in the well, as the cups that are designed for returning the plug to the surface have been damaged during the downward travel, are consequently no longer able to seal efficiently against the inner wall of the flow conductor. The displacement fluid then by-passes the damaged cups and the pump plug stays down in the well.

SUMMARY OF THE INVENTION

An object of the invention is a pump plug for use in well operations such as in TFL-operations or for swabbing purposes, which plug is provided with sealing fins that will not be damaged by being passed through a flow conductor, irrespective of the direction in which the plug is displaced through the conductor.

Another object of the invention is a pump plug for use in well operations, which pump plug can be sealingly displaced in a conduit in one direction followed by a displacement in the opposite direction, without being damaged to an extent that the sealing action between the plug and the inner wall of the conduit is lost, even not if the plug is passing through portions of the conduit where the inner diameter of the conduit varies abruptly.

Another object of the invention is a pump plug for use in well operations wherein the sealing fins of the plug are arranged such that each of the sealing fins will effectively seal off against the wall of the conduit through which the plug is displaced, irrespective of the direction of displacement through the conduit.

The pump plug according to the invention includes a sleeve with a central axis, a plurality of annular sealing fins of resilient material mounted on the sleeve, each sealing fin being flexible in both directions of the central axis of the sleeve and having at least the central portion thereof symmetrically arranged with respect to a plane perpendicular to the said central axis, and support means mounted on the sleeve for supporting the sealing fins in each of the flexed positions thereof.

The support members may consist of ring-shaped members having an outer diameter less than the outer diameters of the annular sealing fins. Each ring-shaped member is arranged at a location adjoining at least one sealing fin. Further, each ring-shaped member is provided with a curved surface contacting the adjoining sealing fin in one of its flexed positions.

BRIEF DESCRIPTION OF THE DRAWINGS

The invention will be described by way of example in more detail with reference to the drawings, wherein.

DESCRIPTION OF A PREFERRED EMBODIMENT

Figure 1:
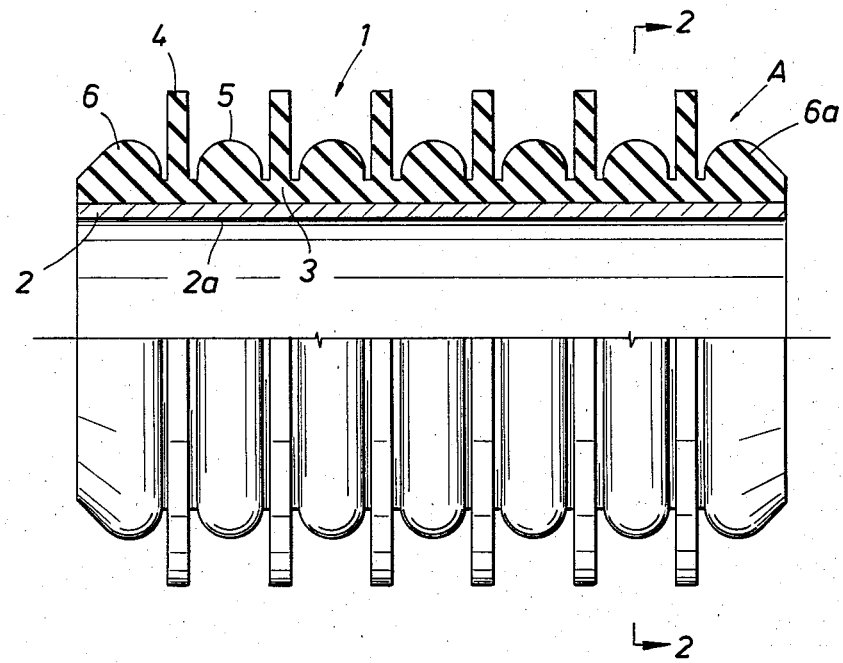
FIG. 1 shows schematically a partial side view/partial longitudinal section over a pump plug according to the invention provided with sealing fins in the form of flat circular discs.

Referring to FIG. 1 of the drawings, the pump plug 1 constructed in accordance with the invention includes a tubular cylindrical sleeve 2 having a throughbore or passage 2a with an integral body 3 of resilient material has been bonded in a suitable manner, as by an adhesive, for example, a glue, to the outer surface of the sleeve 2. The body 3 consists of a plurality of annular fins 4 with an external diameter substantially matching the internal diameter of the flow conductor through which the pump plug is to be propelled by means of a fluid pressure differential generated across the pump plug 1. The diameters should match in such a manner that the rim portion of each fin seals against the flow conductor wall in a manner such that an adequate amount of material at the sealing rim is available to permit wear of the rim without loss of sealing capacity over the periods that the pump plug is being driven through the flow conductor.

The resilient integral body 3 further comprises fin support rings 5 situated between each pair of adjoining fins 4, and support rings 6 and 6a situated at opposite ends of the body 3. The support rings 5 and 6 have outer diameters that are less than the outer diameters of the fins 4.

The material that is used in manufacturing the body 3 should be chosen such that the body 3 can operate under extreme mechanical loads, and extreme pressure, temperature and chemical environments. Suitable materials for this purpose are for example nitrile rubber, carboxylated nitrile rubber and polyurethane elastomers.

The pump plug according to the invention is a bi-directional pump plug in the sense that it can be propelled through a conduit (provided that the passage 2a through the sleeve 2 is closed off) by a differential fluid pressure action in either direction of the conduit. Thus, the plug can be pumped through a conduit in one direction by a fluid pressure differential operating in this direction. A fluid pressure differential in an opposite sense, will move the plug longitudinally through the conduit in this latter sense. At all times, the same fins will seal against the inner wall of the conduit and take the load of the pressure differential thereby driving the plug through the conduit.

Figure 3:
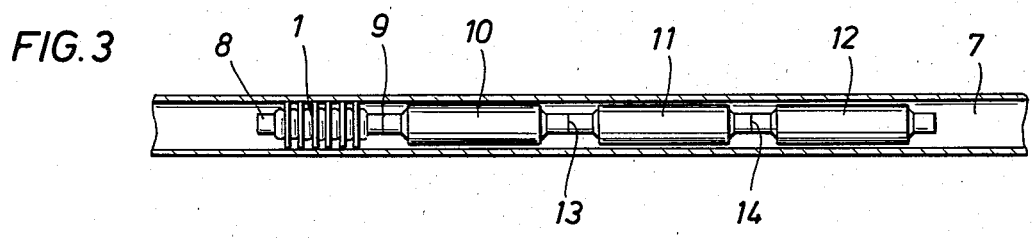
FIG. 3 shows (on a smaller scale) the pump plug of FIG. 1 in operation in a flow conductor when propelling a tool string through the flow conductor.

FIG. 3 shows the pump plug 1 of FIG. 1 in an operative position in a flow conductor 7. The interior passage through the sleeve 2 of the pump plug is closed off (in a manner known per se) by a mandrel 8, which is connected at one side thereof by means of a knuckle joint 9 (known per se) with various well tools 10, 11 and 12 that are interconnected by flexible joints 13 and 14, respectively. Such well tools and joints are known per se and do not require any further detailed explanation.

If desired, additional pump plugs according to the invention may be coupled to the mandrel 8 by means of knuckle joints to increase the driving force of the pump plug 1.

The annular sealing fins 4 (see FIG. 1) of the pump plug 1 are symmetrical with respect to a plane arranged perpendicular to the central longitudinal axis of the pump plug. This form of the fins allows the pump plug to be used in a bidirectional sense. As will now be explained with reference to FIGS. 4 and 5 of the drawings, this type of fins when applied in combination with the support rings 5 will not be liable to being damaged or torn off when the plug is sequentially displaced in opposite directions through a conduit, or being passed through a conduit having local constrictions.

Figure 4:
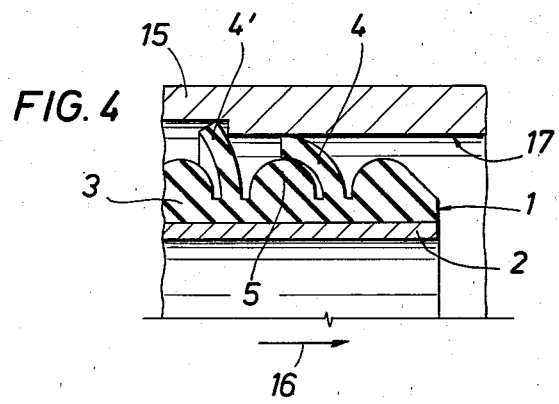
FIG. 4 shows detail A of the pump plug of FIG. 1, when the pump plug is being displaced in a conduit in the direction of the arrow.

FIG. 4 shows detail A of the pump plug of FIG. 1, in the position that the plug is being driven by fluid action through the conduit 15. The fluid pressure differential applied over the pump plug 1 (which has the passage through the sleeve 2 thereof sealed off against the passage of fluid) displaces the plug in the direction of the arrow 16. The plug 1 is shown at a location in the conduit 15, where the leading fin 4 of the plug has just entered the constriction 17 present in the conduit. The leading but one fin 4' is still in that portion of the conduit 15 that has a relatively large diameter, and the fin 4' seals with the rim portion thereof against the wall of the conduit. The diameter of the fins is chosen such that the fins may become slightly curved in longitudinal section when in their operative position in the large-diameter part of the conduit 15. The rim portion of the fin 4' (as well as the rim portions of each of the (not shown) other fins that are present in the large-diameter section of the conduit 15) is kept in contact with the conduit wall by the resiliency of the material of the integral body 3, thereby sealing against this wall. The sealing force is increased by the pressure differential prevailing across the fins and operating to flare the fins outwards against the conduit wall.

The material of the integral body 3 is sufficiently resilient to allow all the fins to be deformed in the manner as shown with reference to the fin 4 in FIG. 4, when the fins enter the constriction 17 of the conduit 15. In this position, each fin 4 is supported by the adjoining support ring or member 5 in such a manner that the tensile forces exerted at the location where the fin joins the cylindrical part of the integral body 3, are relatively small. As a result thereof, cracks that would lead to the fin being torn from the body 3, will not occur, and each fin will flare out again when the pump plug has passed the constriction 17.

Since each of the fins 4 is bounded at opposite sides thereof by a support ring 5, the fins can be deformed in opposite senses depending on the direction in which the plug is passing through a constriction of the conductor tube or conduit through which the plug is being driven.

Figure 5:
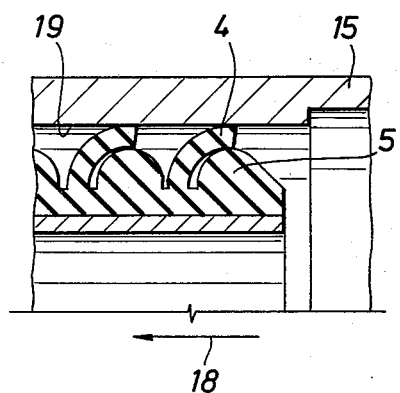
FIG. 5 shows detail A of the pump plug of FIG. 1, when the pump plug is being displaced in a conduit in a direction opposite to the direction of displacement as indicated in FIG. 4.

FIG. 5 shows detail A of the pump plug of FIG. 1 when the plug is driven through the conduit 15 in a direction (see arrow 18) opposite to the direction of movement indicated in FIG. 4. The fins 4 are, when the plug has entered the local constriction 19 of the conduit 15, deformed in a sense opposite to the sense shown in FIG. 4, and then rest against the support rings 5 situated at the trailing sides of the fins.

Figure 6:
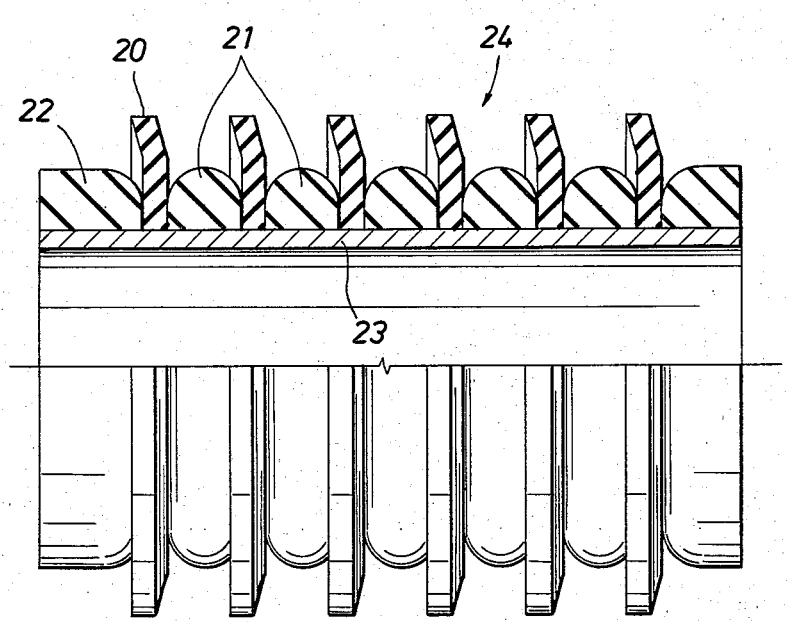
FIG. 6 shows schematically a partial side view/partial longitudinal section over a pump plug with sealing fins having a conical outer portion.

FIG. 6 of the drawings shows another embodiment of the invention. In this embodiment, the fins 20 and the support rings 21 and 22 are separate elements that are bonded to the sleeve 23 of the pump plug 24. The rim portions of the fins 20 have slightly conical shape (the apex of the cone being less than 140 degrees). The main advantage hereof is that the driving force of the plug in the direction of the apex of said cone is increased relative to the pump plug as shown in FIG. 1.

Apart from the fins 4 and 20 (see FIGS. 1 and 6), other types of annular fins may be used in the pump plug according to the present invention. Some examples thereof are shown in FIGS. 7-10 of the drawings. The annular fin 25 (as fragmentarily shown in FIG. 7) is discus-shaped, and glued at the inner rim thereof to the outer wall of a cylindrical sleeve 26. The support rings 27 match the shape of the fin 25, and are also glued to the wall of the sleeve 26. If desired, the rings and the fin may be bonded together. The sleeve 26 may be replaced by a mandrel (not shown) that carries means for connecting the plug to tools that are suitable to be pumped down in a well for carrying out predetermined operations down the well.

Figure 7:
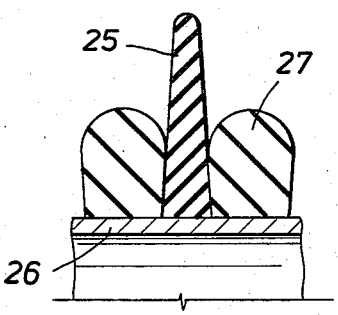
FIGS. 7-10 show alternatives of the sealing fins shown in FIGS. 1 and 6.
Figure 8:
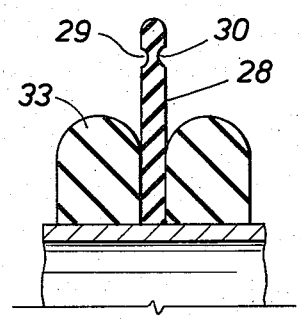

FIG. 8 shows a flat annular fin 28 provided with annular grooves 29, 30 increasing the flexibility of the fin. Such grooves may number more than one, and may, if desired, also be used for increasing the flexibility of other types of fins, such as those shown in FIGS. 7 and 9 of the drawings.

Figure 9:
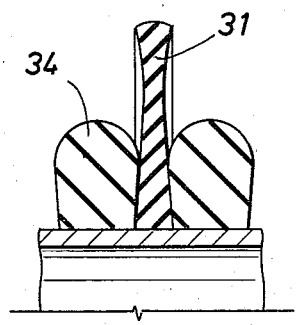

FIG. 9 shows still another type of fin. This fin 31 has the advantage of a relatively large volume rim portion that gives an adequate protection in conduits where excessive wear of the fins may occur.

Figure 10:
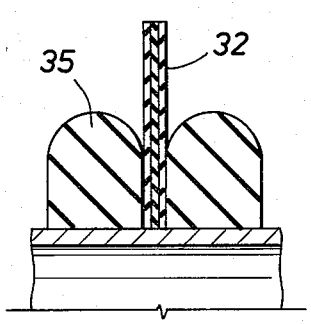

Finally, FIG. 10 shows an annular fin consisting of several thin annular rings 32 of resilient material that are bonded near the inner rim thereof to form an integral fin. This type of fin has an extremely large flexibility which may be of advantage for use on pump plugs that have to be pumped through conduits with narrow constrictions.

It will be appreciated that the support rings 33, 34 and 35 shown in FIGS. 8, 9 and 10, respectively, match the fins with which they have to cooperate when the fins are deformed during the displacement of the pump plug through a conduit, and are bonded to the sleeve and/or the fins in the way as referred to with reference to FIG. 7.

Although the embodiments of the invention discussed by way of example with reference to the drawings are all described as being pump plugs for use in TFL-operations, it will be appreciated that each of the embodiments can also be used as a swab in well swabbing operations. Such well swabbing procedures are well known, and do not require any detailed description.

Finally it is observed that the fins and the support members shown in FIGS. 6-10 of the drawings may be made of different materials. The material of the fins should have a sufficient flexibility to allow the fins to be deformed to a position wherein they are supported by the support members, when the plug passes through narrow portions of a flow conductor, such as through constrictions, curves or bends thereof. The support means may be made of non-resilient material, which material is, just as the material of the fins, suitable to withstand the often extreme conditions to which the plug is being subjected in wells penetrating deep-lying underground formations. The resistance against mechanical wear may be less than the wear resistance of the material used for the fins.

Figure 2:
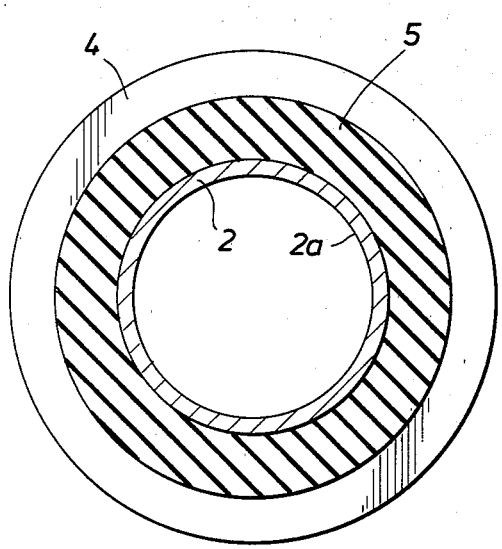
FIG. 2 shows the cross-section 2—2 over the pump plug of FIG. 1.

The fins and support members may be separate elements as shown in FIGS. 6-10, or form part of an integral body as shown in FIGS. 1 and 2. In an alternative embodiment, the pump plug according to the invention may consist of a cylindrical sleeve (or a mandrel) carrying elements consisting of one or more fins and two or more supporting means. The elements may be bonded to the outer surface of the sleeve or the mandrel, or mounted on the sleeve or mandrel in any other suitable manner, such as by being clamped thereon in axial direction by means of nuts screwed on screwthreads arranged at both ends of the sleeve or mandrel.

We claim as our invention:

1. Pump plug for use in well operations, the plug comprising a tubular sleeve with a throughbore having a central axis, a plurality of annular sealing fins of resilient material mounted outwardly on the sleeve, each sealing fin being flexible in both directions of the central axis of the sleeve and having at least the central portion thereof symmetrically arranged with respect to a plane perpendicular to the said central axis, and support means mounted on the sleeve on both sides of the sealing fins for supporting the sealing fins in both of the flexed positions thereof, each of said support means being circular in shape and having a diameter less than the adjacent sealing fin, the outer edge of each support means being curved upwardly and inwardly, when viewed in axial cross-section, at least on the surface adjacent a sealing fin, said support means having a thickness sufficient such that the curved outer edge thereof forms a support for that portion of the sealing fin extending radially outwardly beyond the curved outer edge of the support means.

2. Pump plug according to claim 1, wherein the outer portion of each sealing fin is conically shaped.

3. Pump plug according to claim 2, wherein the apex of the cone is less than 140 degrees.

4. Pump plug according to claim 1, wherein the outer portion of each sealing fin is symmetrically arranged with respect to the plane of symmetry of the central portion of the fin.

5. Pump plug according to claim 1, wherein the fins and the support means form an integral body of resilient material.

* * * * *